United States Patent
Deis et al.

(10) Patent No.: US 7,416,754 B2
(45) Date of Patent: Aug. 26, 2008

(54) ICE CREAM AND ICE CREAM FORMULATIONS CONTAINING MALTITOL

(75) Inventors: Ronald C. Deis, West Chester, PA (US); Charles E. Kuenzle, Newark, DE (US); Bruce W. Tharp, Villanova, PA (US)

(73) Assignee: Corn Products International. Inc., Westchester, IL (US)

( * ) Notice: Subject to any disclaimer, the term of this patent is extended or adjusted under 35 U.S.C. 154(b) by 202 days.

(21) Appl. No.: 11/034,029

(22) Filed: Jan. 12, 2005

(65) Prior Publication Data

US 2005/0202127 A1    Sep. 15, 2005

Related U.S. Application Data

(60) Provisional application No. 60/536,062, filed on Jan. 13, 2004.

(51) Int. Cl.
 *A23L 1/236* (2006.01)
 *A23C 9/00* (2006.01)
 *A23G 9/00* (2006.01)

(52) U.S. Cl. .................. 426/548; 426/565; 426/580

(58) Field of Classification Search ................. 426/515, 426/548, 564, 565, 580, 586
See application file for complete search history.

(56) References Cited

U.S. PATENT DOCUMENTS 4,675,200 A * 6/1987 Serpelloni et al. ........... 426/567

FOREIGN PATENT DOCUMENTS

| JP | 61-85149 | * | 4/1986 |
| JP | 8-98652 | * | 4/1996 |

* cited by examiner

*Primary Examiner*—Leslie Wong
(74) *Attorney, Agent, or Firm*—Connolly Bove Lodge & Hutz LLP

(57) ABSTRACT

The present invention relates to ice cream formulations containing maltitol and ice cream made therefrom.

20 Claims, 4 Drawing Sheets

ICE CREAM AND ICE CREAM FORMULATIONS CONTAINING MALTITOL

CROSS-REFERENCE TO RELATED PATENT APPLICATION

The present application claims the benefit of the Jan. 13, 2004, filing date of U.S. provisional application No. 60/536,062. The complete disclosure of U.S. provisional application No. 60/536,062 is hereby expressly incorporated herein by reference.

BACKGROUND OF THE INVENTION

1. Field of the Invention

The present invention relates to ice cream formulations containing maltitol and ice cream made therefrom.

2. Description of the Related Art

Maltitol is a polyol that is produced from the catalytic hydrogenation of high maltose corn syrup. Maltitol has approximately 90 percent of the sweetness of sugar and is generally recognized to have a caloric value of about 2.1 kcal/g. Products sweetened with maltitol meet the FDA's definition of "no sugar added" or "sugarless." These properties allow maltitol to be used as a reduced-calorie sweetener in the United States. Maltitol is relatively slowly absorbed by the human digestive system, yet has a Taxation threshold that is about two times that of sorbitol. Maltitol also has a heat of solution comparable to sucrose, making it a popular sugar-free substitute sweetener. Maltitol is commonly used in candies, chewing gum, chocolates, jams and jellies, and frozen desserts.

Maltitol has a pleasant sweet taste and because maltitol has a relative sweetness value of 90, for most applications there is no need to adjust the sweetness. Unlike sorbitol, maltitol does not exhibit a strong cooling effect. Maltitol also has very good heat stability, which means that it can be handled at high temperature without decomposition or color formation. Due to the nature of maltitol and the virtual absence of reducing sugars, maltitol can be concentrated to very high dry substance levels without unwanted discoloration or browning reactions. Maltitol also has excellent humectancy capacity due to its hygroscopic character.

Hydrogenated mono-, di-, oligo- and poly-saccharides are characterized by the degree of polymerization (DP) after hydrogenation. Hydrogenated monosaccharides have a DP=1. Hydrogenated disaccharides have a DP=2. Hydrogenated tri-, quat-, penta-, hexa-, hepta-, octa-, nona-, and deca-saccharides have DPs of 3, 4, 5, 6, 7, 8, 9, and 10, respectively. Hydrogenated undeca- and greater saccharides have DPs of 11 or greater. The DP may be determined by routine HPLC analysis.

Generally, the term hydrogenated starch hydrolysate can correctly be applied to any polyol produced by the hydrogenation of the saccharide products of starch hydrolysis. In practice, however, certain polyols such as sorbitol, mannitol, and maltitol are referred to by their common chemical names. "Hydrogenated starch hydrolysate" is more commonly used to describe the broad group of polyols that contain substantial quantities of hydrogenated oligo- and polysaccharides in addition to any monomeric or dimeric polyols (sorbitol/mannitol or maltitol, respectively).

U.S. Pat. No. 4,675,200 to Serpelloni et al., which is hereby incorporated by reference, describes sugarless ice cream containing a polyol content of DP equal to or higher than three (3) of more than 2% and less than 15% by weight with respect to dry matter in the finished product. Some of these ice cream formulations contain, as the polyol component, an HSH which contains maltitol in amounts of from 8 to 80% by weight, 20 to 75% by weight or 35 to 80% by weight.

SUMMARY OF THE INVENTION

One embodiment of the present invention is an ice cream formulation that comprises:

a) fat in an amount of from 6 to 15% by weight;
b) non-fat milk solids in an amount of from 6 to 12% by weight; and
c) maltitol in an amount of from 10 to 25% by weight, all of the above weight percentages based on the total weight of the ice cream formulation.

Another embodiment of the present invention is an ice cream formulation that comprises:

a) fat in an amount of from 8 to 12% by weight;
b) non-fat milk solids in an amount of from 7 to 12% by weight; and
c) maltitol in an amount of from 10 to 20% by weight, all of the above weight percentages based on the total weight of the ice cream formulation.

Another embodiment of the present invention is an ice cream formulation that comprises:

a) fat in an amount of from 8 to 10% by weight;
b) non-fat milk solids in an amount of from 8 to 10% by weight; and
c) maltitol in an amount of from 12 to 18% by weight, all of the above weight percentages based on the total weight of the ice cream formulation.

The ice cream formulations of the present invention can also comprise stabilizers, flavoring agents and other typical ingredients that are found in commercial ice cream.

When a stabilizer is present in the ice cream formulations of the present invention, it is usually present in an amount of from 0.1 to 0.5% by weight, based on the weight of the solids present in the ice cream.

On a dry solids basis, the ice cream formulations of the present invention contain from about 25% by weight maltitol to about 45% by weight maltitol or from about 28% by weight maltitol to about 40% by weight maltitol or from about 30% by weight maltitol to about 38% by weight maltitol.

In one embodiment of the present invention, the ice cream formulations contain no added sucrose. In another embodiment of the present invention, the ice cream formulations contain from 0.01 to 2% added sucrose.

The invention also concerns ice cream that is made from the aforementioned formulations, typically by subjecting the ice cream formulations to pasteurization, homogenization, and freezing (with aeration).

DETAILED DESCRIPTION OF THE INVENTION

Figure 1:
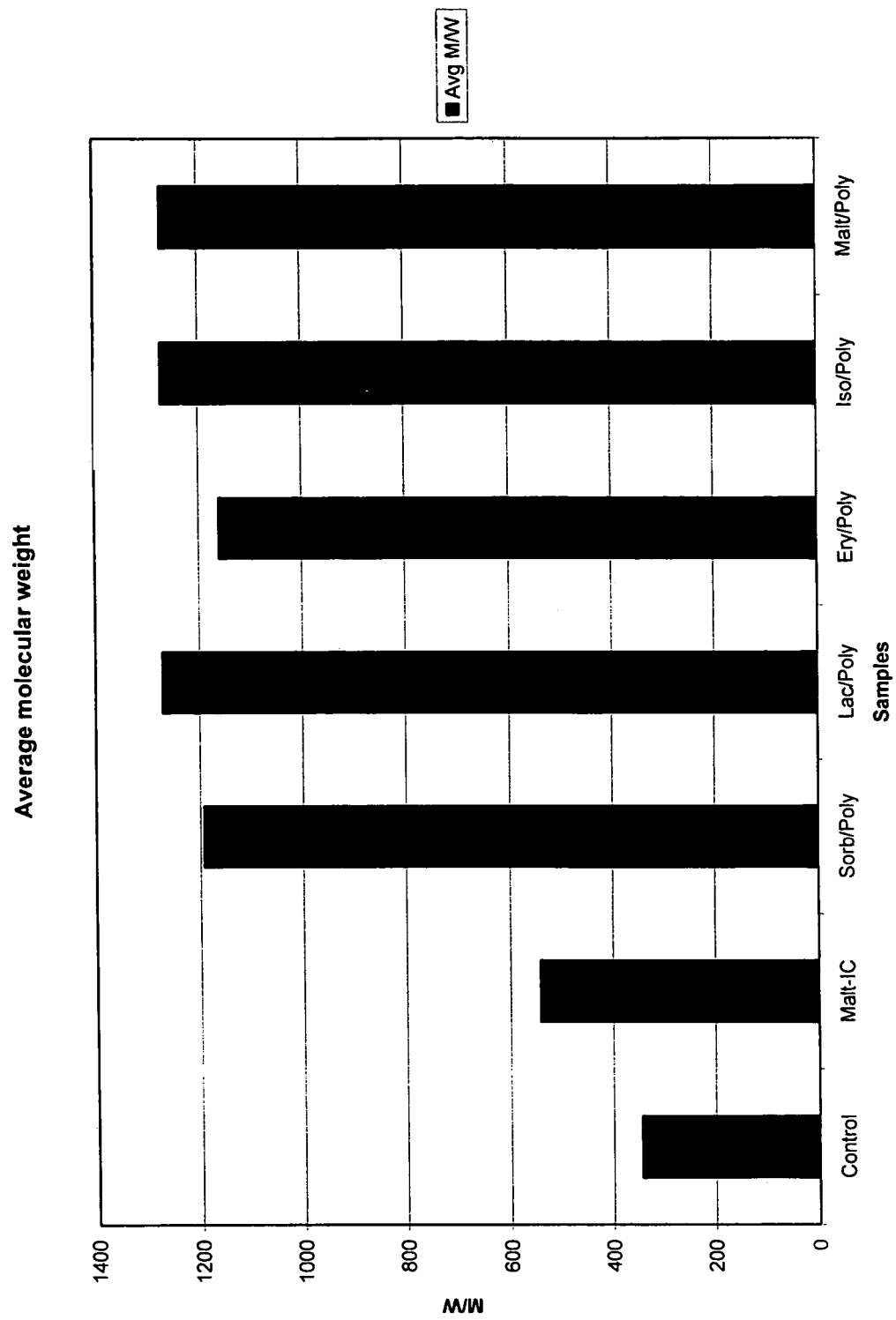
FIG. 1 is a graph of the average molecular weight of the solids used as sweeteners in the ice cream formulations 1 to 7.

The ice cream formulations of the present invention can be produced by the method described below. While the method described below is the preferred method of producing the ice cream formulations of the present invention, it may not be the only method. Accordingly, the method should be viewed as being illustrative and not necessarily limiting. Also, the formulations described below as examples of the present invention are provided to enable the reader to better understand the invention but not to limit the scope of the invention.

A 12% by weight fat ice cream formulation was prepared by first mixing the wet ingredients: 40% dairy cream (a heavy whipping cream), a maltitol syrup (Maltisweet™ IC—about 75% solids containing about 65% by weight maltitol) and water and then slowly adding the dry ingredients to the wet ingredients while mixing. The dry ingredients were non-fat milk solids and a stabilizer (microcrystalline cellulose—xp-3548 from FMC). After the addition of the dry ingredients, the formulation was mixed for 20 minutes with a high speed mixer to ensure that the formulation is homogeneous. After the mixing step, the formulation is pasteurized in a double boiler at about 160 degrees F for 20 minutes. The weight of the formulation is recorded before the pasteurization step so that any water that evaporates from the formulation can be replaced. After the pasteurization step, and after any evaporated water has been replaced, the formulation is homogenized in a two-stage homogenizer (Gaulin) using 1500 psi in the first stage and 500 psi in the second stage. The homogenized ice cream formulation is then quickly cooled over a heat transfer board (cooling board) that reduces the temperature of the mix from about 160 degrees F to about 40 degrees F. The ice cream formulation is then collected in glass jars with lids. If the ice cream formulation is to be consumed by eating, flavoring agents (such as vanilla) can be added to the formulation and the formulation can then be frozen. If tests are to be performed on the ice cream formulation the glass jars are placed into a refrigerator overnight at a temperature below 40 degrees F and then the next day (about 12 to 24 hours later), the formulation is checked for separation, viscosity and weight (to determine density and overrun) at 40 degrees F. The ice cream formulation is then poured from the glass jars into the cavity of a 2.5 gallon Taylor freezer. The Taylor freezer is then turned on with the thermostat set to 23 degrees F. As the ice cream formulation is agitated (aerated) and cooled in the Taylor freezer, the weight and temperature of the ice cream formulation is measured and recorded at two minute intervals so that the overrun can be determined. These measurements are taken until the temperature light on the Taylor freezer goes off and then turns back on (i.e., one temperature cycle). When the light on the Taylor freezer comes back on, samples are taken from the formulation in the Taylor freezer and placed in plastic containers with lids. The plastic containers and their contents are placed in a freezer at −18 degrees F for seven (7) days and then the hardness of the resulting ice cream is measured and the extent of syneresis is determined.

The formulations shown in Table 1 were prepared by the process described above.

In formulation number 1 (control), sucrose was added (as a dry ingredient) instead of the maltitol syrup.

In formulation 2, a maltitol syrup according to the present invention is used instead of the sucrose used in the control.

The polyols used in formulation numbers 3, 4, 5, 6 and 7 (i.e., instead of the maltitol syrup), are described below.
Formulation 3—polydextrose (solid); sorbitol (solid).
Formulation 4—polydextrose (solid); lactitol (solid).
Formulation 5—polydextrose (solid); erythritol (solid).
Formulation 6—polydextrose (solid); isomalt (solid).
Formulation 7—polydextrose (solid); maltitol (solid).

TABLE 1

NO SUGAR ADDED ICE CREAM FORMULATIONS
All of the batches have 12% fat.

| Ingredients | #1 CONTROL | #2 | #3 | #4 | #5 | #6 | #7 |
|---|---|---|---|---|---|---|---|
| 40% Cream Heavy Whipping Cream | 30 | 30 | 30 | 30 | 30 | 30 | 30 |
| NFDMS | 9.4 | 10 | 10 | 10 | 10 | 10 | 10 |
| SUCROSE | 15 | 0 | 0 | 0 | 0 | 0 | 0 |
| Maltisweet ™ IC | 0 | 28.53 | 0 | 0 | 0 | 0 | 0 |
| SORBITOL | 0 | 0 | 7.5 | 0 | 0 | 0 | 0 |
| POLYDEXTROSE | 0 | 0 | 7.5 | 7.5 | 7.5 | 7.5 | 7.5 |
| LACTITOL | 0 | 0 | 0 | 7.5 | 0 | 0 | 0 |
| ERYTHRITOL | 0 | 0 | 0 | 0 | 7.5 | 0 | 0 |
| ISOMALT | 0 | 0 | 0 | 0 | 0 | 7.5 | 0 |
| MALTITOL | 0 | 0 | 0 | 0 | 0 | 0 | 7.5 |
| FMC-xp-3548 | 0.45 | 0.45 | 0.45 | 0.45 | 0.45 | 0.45 | 0.45 |
| Water | 45.15 | 31.02 | 44.55 | 44.55 | 44.55 | 44.55 | 44.55 |

6000 Gram Batch

Note
Add 0.5% (30 ml of a 10% solution in ethyl alcohol) Vanilla When Freezing the mix The following ice cream formulations A to E can be prepared by a method that is similar to the method described above.

All of the batches have 12% fat.

| Ingredients | A | B |
|---|---|---|
| 40% CREAM Heavy Whipping Cream | 30 | 30 |
| NFDMS | 8 | 10 |
| SUCROSE | 0 | 0 |
| Maltisweet ™ MH 80 | 0 | 19.5 |
| Maltisweet ™ IC | 21.4 | 0 |
| FMC-xp-3548 | 0.45 | 0.45 |
| Water | 40.15 | 40.05 |

Batches C and D have 14% fat and Batch E has 12% fat.

| Ingredients | C | D | E |
|---|---|---|---|
| 40% CREAM Heavy Whipping Cream | 35 | 35 | 30 |
| NFDMS | 6 | 6 | 6 |
| Maltisweet ™ IC | 22.5 | 21.4 | 22.5 |
| Cocoa powder | 3.5 | 3.5 | 3.5 |
| FMC-xp-3548 | 0.42 | 0.42 | 0.45 |
| Water | 32.58 | 33.68 | 37.55 |

Table 2 shows a breakdown of the components in some of the maltitol syrups referenced herein.

TABLE 2

|  | Weight % (HPLC) MS-IC | Weight % (HPLC) MH65 | Weight % (HPLC) MH80 | Mol. Wt. MW | AMW MS-IC | AMW MH65 | AMW MH80 |
|---|---|---|---|---|---|---|---|
| Sorbitol | 3.4 | 1.54 | 1.1 | 186 | 6.324 | 2.8644 | 2.046 |
| Mannitol | 0.12 | 0 | 0 | 186 | 0.2232 | 0 | 0 |
| Maltitol | 67.03 | 76.85 | 78.3 | 382 | 256.0546 | 293.567 | 299.106 |
| HP-3 | 16.4 | 3.26 | 2.94 | 558 | 91.512 | 18.1908 | 16.4052 |
| HP-4 | 2 | 0 | 0.49 | 744 | 14.88 | 0 | 3.6456 |
| HP-5 | 2.15 | 0 | 0 | 930 | 19.995 | 0 | 0 |
| HP-6 | 1.22 | 0.39 | 0.72 | 1116 | 13.6152 | 4.3524 | 8.0352 |
| HP-7 | 1.01 | 2.24 | 1.82 | 1302 | 13.1502 | 29.1648 | 23.6964 |
| HP-8 | 0.51 | 0 | 0 | 1488 | 7.5888 | 0 | 0 |
| HP-9 | 0 | 0 | 0 | 1674 | 0 | 0 | 0 |
| HP-10 | 0 | 0 | 0 | 1860 | 0 | 0 | 0 |
| HP-11+ | 5.83 | 15.5 | 14.2 | 2046 | 119.2818 | 317.13 | 290.532 |
|  |  |  |  |  | 542.6248 | 665.2694 | 643.4664 |
| AMW | 542.6248 | 665.2694 | 643.4664 |  |  |  |  |

AMW = Average Molecular Weight (grams/mole)

In a preferred embodiment of the present invention, the average molecular weight of the solids portion of the maltitol syrup used is from 500 to 600 grams/mole. Other preferred embodiments of the present invention use maltitol syrups having average molecular weights (solids portion) of from 510 to 580 grams/mole, from 515 to 570 grams/mole, from 520 to 560 grams/mole or from 530 to 550 grams/mole.

In one of the preferred embodiments of the present invention, the maltitol syrup used is Maltisweet™ IC (a product of SPI Polyols, Inc., New Castle, Del.). This syrup has an average molecular weight (solids portion) of about 540 to 545 grams/mole, usually from 542 to 544 grams/mole (depending on the exact composition of the syrup).

As shown in FIG. 1, of the seven sweeteners used to prepare the formulations 1 to 7 (described above), Maltisweet™ IC has an average molecular weight that is the most similar to the control, which is sucrose. It is believed that this similarity in the average molecular weight between Maltisweet™ IC and sucrose is at least partially responsible for the excellent properties demonstrated by the ice cream formulations of the present invention, including the similarities in sweetness and mouthfeel between ice creams made from the formulations of the present invention and commercial ice creams containing sweetening compositions that are based primarily or completely on sucrose.

Figure 2:
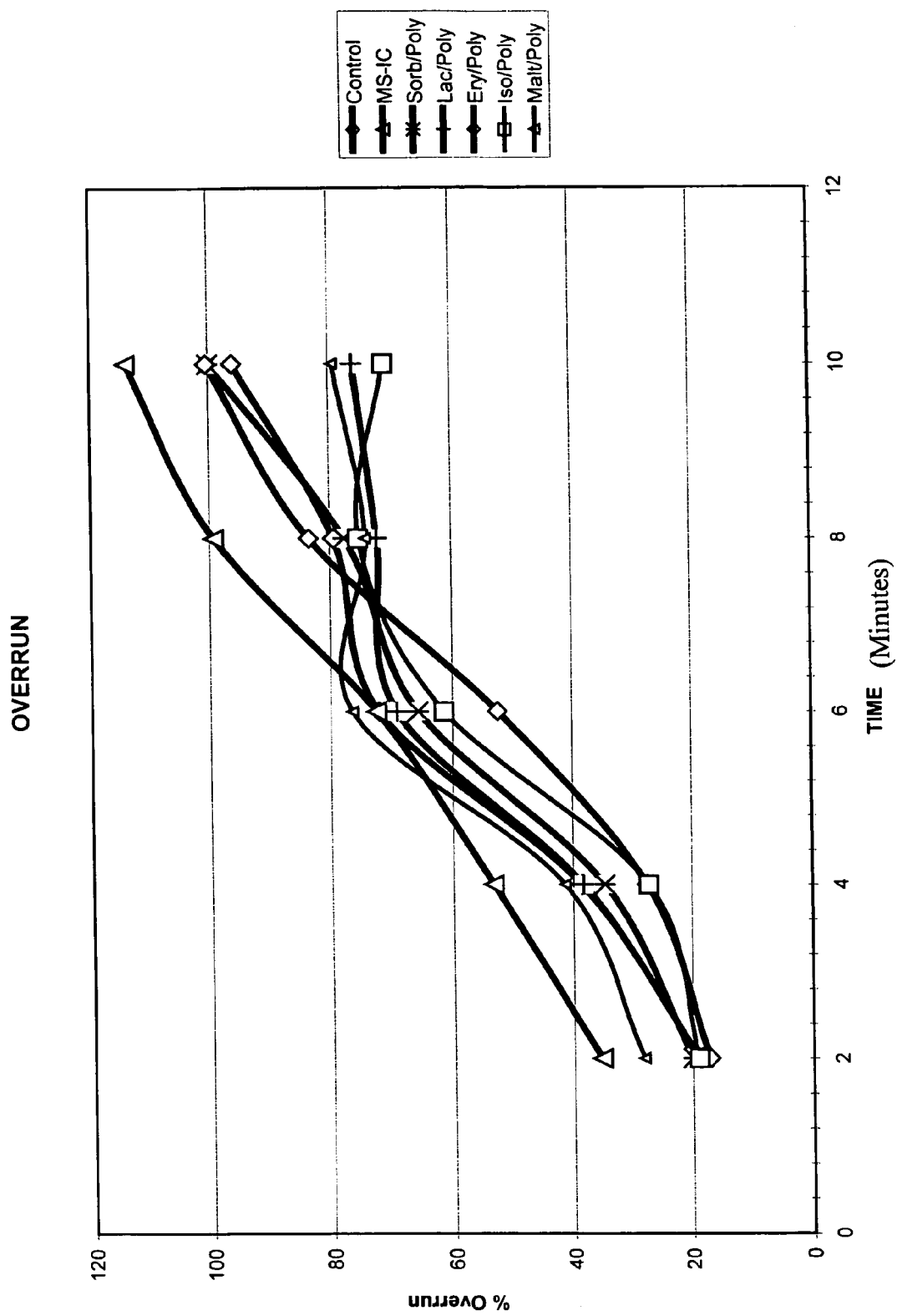
FIG. 2 is a graph showing the % overrun of the ice cream formulations 1 to 7 over time (minutes) as they are being aerated and frozen.

FIG. 2 shows the overrun of the ice cream formulations 1 to 7, described above, as it develops over time (i.e., the time that the ice cream formulations are being aerated). Overrun is the amount of air incorporated into an ice cream and is usually expressed as "% overrun". The percent overrun is determined by the increase in volume of the final ice cream formulation caused by the aeration step. The increase in volume of the mix (final volume of the mix after aeration minus the initial volume of the mix before aeration) is divided by the initial volume of the mix and then multiplied by 100 to get a percentage. As shown in FIG. 2, the ice cream formulation made with Maltisweet™ IC not only has the greatest overrun of any of the ice cream formulations tested, it also reaches 100% overrun faster than any of the other formulations. This should result in a substantial savings of time and energy in the commercial manufacture of ice creams based on this formulation. It is believed that these properties are due, at least in part, to the average molecular weight of Maltisweet™ IC (which is similar to the control, sucrose).

Figure 3:
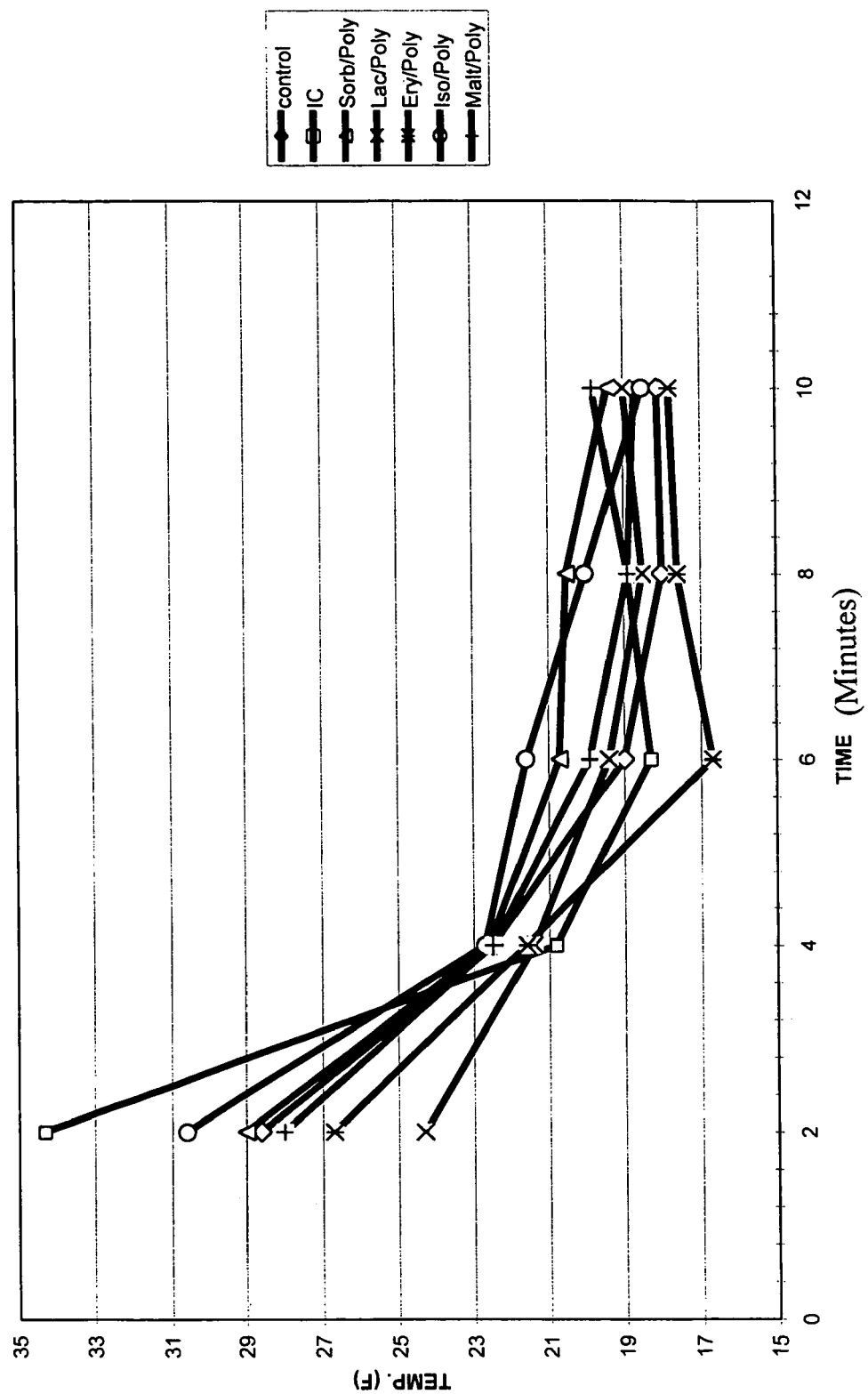
FIG. 3 is a graph showing the temperature of several ice cream formulations over time (minutes) as they are freezing.

FIG. 3 shows the temperature of the ice cream mixes or formulations (i.e., formulations 1 to 7, described above) over time as they are freezing.

Figure 4:
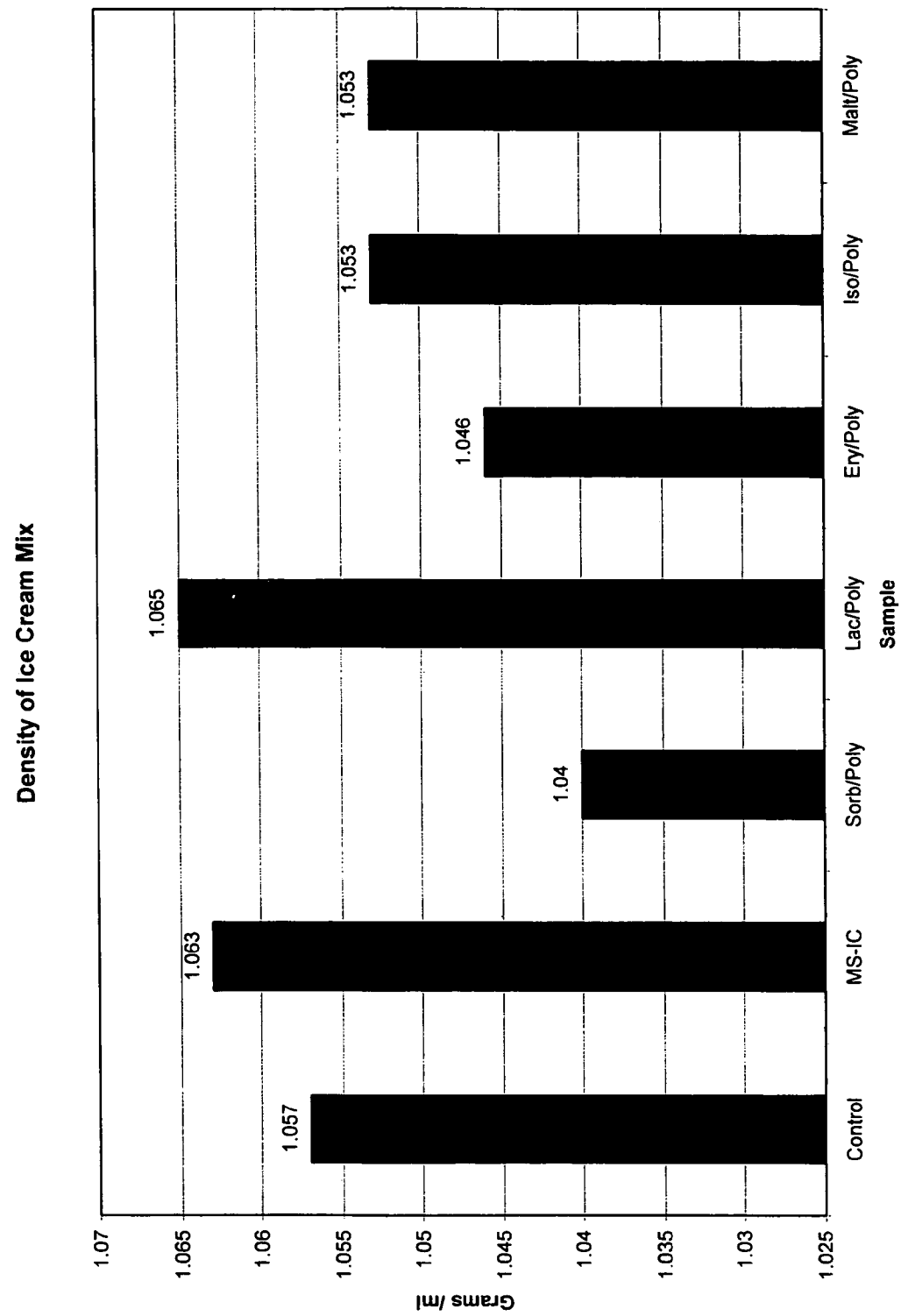
FIG. 4 is a graph showing the density of several ice cream formulations prior to freezing and aeration.

FIG. 4 shows the density of the ice cream mixes or formulations described above (i.e., formulations 1 to 7). The densities were measured prior to freezing and aeration. The differences in the densities of the formulations did not seem to have a significant impact on the freezing or overrun of the formulations.

While the invention has been particularly shown and described with reference to preferred embodiments thereof, it will be understood by those skilled in the art that various changes in form and details may be made without departing from the spirit and scope of the invention.

What is claimed is:

1. An ice cream formulation comprising:
    a) fat in an amount of from 6 to 15% by weight, based on the total weight of the ice cream formulation;
    b) non-fat milk solids in an amount of from 6 to 12% by weight, based on the total weight of the ice cream formulation; and
    c) maltitol in an amount of from 30 to 45% by weight, on a dry solids basis.

2. The ice cream formulation of claim 1, wherein:
    the fat is present in an amount of from 8 to 12% by weight; and
    the non-fat milk solids are present in an amount of from 7 to 12% by weight.

3. The ice cream formulation of claim 1, wherein:
    the fat is present in an amount of from 8 to 10% by weight; and
    the non-fat milk solids are present in an amount of from 8 to 10% by weight.

4. The ice cream formulation of claim 1, further comprising:
    one or more stabilizers and flavoring agents.

5. The ice cream formulation of claim 1, further comprising from 0.1 to 0.5% by weight of one or more stabilizers, wherein the weight percent of said one or more stabilizers is based on the weight of the solids present in the ice cream formulation.

6. The ice cream formulation of claim 1, wherein said ice cream formulation contains no added sucrose.

7. The ice cream formulation of claim 1, wherein said ice cream formulation contains from 0.01 to 2% added sucrose.

8. The ice cream formulation of claim 1, wherein the ice cream formulation contains from 30 to about 38% by weight maltitol on a dry solids basis.

9. Ice cream comprising:
   a) fat in an amount of from 6 to 15% by weight, based on the total weight of the ice cream formulation;
   b) non-fat milk solids in an amount of from 6 to 12% by weight, based on the total weight of the ice cream formulation; and
   c) maltitol in an amount of from 30 to 45% by weight, on a dry solids basis.

10. The ice cream of claim 9, wherein:
   the fat is present in an amount of from 8 to 12% by weight; and
   the non-fat milk solids are present in an amount of from 7 to 12% by weight.

11. The ice cream of claim 9, wherein:
   the fat is present in an amount of from 8 to 10% by weight; and
   the non-fat milk solids are present in an amount of from 8 to 10% by weight.

12. The ice cream of claim 9, further comprising:
   one or more stabilizers and flavoring agents.

13. The ice cream of claim 9, further comprising from 0.1 to 0.5% by weight of one or more stabilizers, wherein the weight percent of said one or more stabilizers is based on the weight of the solids present in the ice cream.

14. The ice cream of claim 9, wherein said ice cream contains no added sucrose.

15. The ice cream of claim 9, wherein said ice cream contains from 0.01 to 2% added sucrose.

16. The ice cream of claim 9, wherein the ice cream contains from 30% to about 38% by weight maltitol on a dry solids basis.

17. An ice cream formulation comprising:
   a) fat in an amount of from 10 to 15% by weight, based on the total weight of the ice cream formulation;
   b) non-fat milk solids in an amount of from 6 to 12% by weight, based on the total weight of the ice cream formulation; and
   c) maltitol in an amount of from 30 to 45% by weight, on a dry solids basis.

18. The ice cream formulation of claim 17, wherein:
   the fat is present in an amount of from 10 to 14% by weight; and
   the non-fat milk solids are present in an amount of from 7 to 12% by weight.

19. The ice cream formulation of claim 17, wherein:
   the fat is present in an amount of from 10 to 12% by weight; and
   the non-fat milk solids are present in an amount of from 7 to 12% by weight.

20. The ice cream formulation of claim 17, wherein:
   the fat is present in an amount of from 12 to 14% by weight.

* * * * *

UNITED STATES PATENT AND TRADEMARK OFFICE
CERTIFICATE OF CORRECTION

PATENT NO. : 7,416,754 B2  Page 1 of 1
APPLICATION NO. : 11/034029
DATED : August 26, 2008
INVENTOR(S) : Ronald C. Deis et al.

It is certified that error appears in the above-identified patent and that said Letters Patent is hereby corrected as shown below:

At page 1, column 1, line 27 should read --the human digestive system, yet has a laxation threshold that--

Signed and Sealed this

Eleventh Day of November, 2008

JON W. DUDAS
*Director of the United States Patent and Trademark Office*